US012701368B2

(12) United States Patent
Post

(10) Patent No.: US 12,701,368 B2
(45) Date of Patent: Aug. 4, 2026

(54) SOUND AND VIBRATION SENSOR

(71) Applicant: Sonion Nederland B.V., Hoofddorp (NL)

(72) Inventor: Peter Christiaan Post, Hoofddorp (NL)

(73) Assignee: Sonion Nederland B.V., Hoofddorp (NL)

( * ) Notice: Subject to any disclaimer, the term of this patent is extended or adjusted under 35 U.S.C. 154(b) by 378 days.

(21) Appl. No.: 18/261,053

(22) PCT Filed: Jan. 25, 2022

(86) PCT No.: PCT/EP2022/051620
§ 371 (c)(1),
(2) Date: Jul. 11, 2023

(87) PCT Pub. No.: WO2022/161945
PCT Pub. Date: Aug. 4, 2022

(65) Prior Publication Data
US 2024/0064474 A1      Feb. 22, 2024

(30) Foreign Application Priority Data
Jan. 28, 2021    (DK) ........................... PA 2021 70034

(51) Int. Cl.
*H04R 19/04*          (2006.01)
*G01H 11/06*          (2006.01)
(Continued)

(52) U.S. Cl.
CPC ............. *H04R 19/04* (2013.01); *G01H 11/06* (2013.01); *H04R 1/04* (2013.01); *H04R 7/04* (2013.01); *H04R 2201/003* (2013.01)

(58) Field of Classification Search
CPC ................................. G01H 11/06; H04R 19/04
See application file for complete search history.

(56) References Cited

U.S. PATENT DOCUMENTS 10,386,223 B2    8/2019  Mögelin et al.
2008/0123876 A1  5/2008  Sato et al.
(Continued)

FOREIGN PATENT DOCUMENTS

WO    WO-2016/120213 A1    8/2016
WO    WO-2018/091690 A1    5/2018

OTHER PUBLICATIONS

European Office Action dated Jul. 7, 2025 for corresponding European Application No. 22704745.3.
(Continued)

*Primary Examiner* — Walter L Lindsay, Jr.
*Assistant Examiner* — Andrew V Do
(74) *Attorney, Agent, or Firm* — Harness, Dickey & Pierce, P.L.C.

(57)          ABSTRACT

The present invention relates to a sound and vibration sensor comprising pressure generating arrangement adapted to generate pressure variations in a first and a second rear volume in response to vibrations of the sound and vibration sensor, the pressure generating arrangement comprising a moveable mass secured to a suspension member, and a first and a second pressure detecting arrangement, wherein the first and second pressure detecting arrangements are acoustically connected to a front volume of the sound and vibration sensor, and wherein each front volume is acoustically connected to the exterior of the sound and vibration sensor via a sound inlet, wherein the first pressure detecting arrangement is acoustically connected to the first rear volume, and that the second pressure detecting arrangement is acoustically connected to the second rear volume. The present invention further relates to a personal audio device comprising a sound and vibration sensor.

20 Claims, 6 Drawing Sheets

(51) Int. Cl.
    *H04R 1/04*        (2006.01)
    *H04R 7/04*        (2006.01)

(56)           References Cited

U.S. PATENT DOCUMENTS

| | | |
|---|---|---|
| 2016/0295328 A1 | 10/2016 | Park |
| 2017/0156002 A1 | 6/2017 | Han et al. |
| 2018/0058915 A1* | 3/2018 | Mögelin .............. H04R 1/2807 |
| 2019/0127218 A1 | 5/2019 | Ghidoni et al. |
| 2020/0075839 A1 | 3/2020 | Sooriakumar et al. |
| 2020/0196065 A1 | 6/2020 | Pedersen et al. |

OTHER PUBLICATIONS

International Search Report for International application No. PCT/EP2022/051620 dated May 12, 2022.
Written Opinion for International application No. PCT/EP2022/051620 dated May 12, 2022.

* cited by examiner

SOUND AND VIBRATION SENSOR

CROSS-REFERENCE TO RELATED APPLICATIONS

This application is a national phase under 35 U.S.C. § 371 of PCT International Application No. PCT/EP2022/051620 which has an International filing date of Jan. 25, 2022, which claims priority to Denmark Application No. PA202170034, filed Jan. 28, 2021, the entire contents of each of which are hereby incorporated by reference.

FIELD OF THE INVENTION

The present invention relates to a sound and vibration sensor for personal audio devices, including hearing devices, hearing aids, hearables, earbuds or the like. In particular, the present invention relates to a sound and vibration sensor comprising a pressure generating arrangement adapted to generate pressure variations in a first and a second rear volume in response to vibrations of the sound and vibration sensor, and a first and a second pressure detecting arrangement acoustically connected to a front volume of the sound and vibration sensor, wherein each front volume is acoustically connected to the exterior of the sound and vibration sensor via a sound inlet. The sound and vibration sensor of the present invention is capable of measuring both sound and vibrations at the same position.

BACKGROUND OF THE INVENTION

Personal audio devices are often equipped with multiple transducers, e.g. microphones and vibration sensors, to pick-up ambient sound, sound in the ear canal and/or bone conducted speech. The use of multiple transducers is however disadvantageous in that multiple transducers occupy considerable space inside personal audio devices. Moreover, aesthetically attractive audio devices are difficult to manufacture in case multiple space-requiring transducers are to be incorporated.

US 2020/0196065 A1 discloses a transducer comprising an acoustic transducer 110 and a vibration transducer 160, cf. for example FIG. 8. The transducer proposed in US 2020/0196065 A1 is disadvantageous due its high noise caused by the rather low mass of the moveable member.

Thus, there seems to be a need for small and integrated transducers for personal audio devices in order to extend the functionality thereof without compromising the aesthetics and necessary compactness of the audio devices.

It may therefore be seen as an object of embodiments of the present invention to provide a sound and vibration sensor being capable of measuring both sound and vibrations.

It may be seen as a further object of embodiments of the present invention to provide smaller sound and vibration sensors that take up less space in housings of personal audio devices.

It may be seen as an even further object of embodiments of the present invention to provide a sound and vibration sensor being capable of measuring sound and vibrations at the same position, i.e. at the same spot.

DESCRIPTION OF THE INVENTION

The above-mentioned objects are complied with by providing, in a first aspect, a sound and vibration sensor comprising a) a pressure generating arrangement adapted to generate pressure variations in a first and a second rear volume in response to vibrations of the sound and vibration sensor, the pressure generating arrangement comprising a moveable mass secured to a suspension member, and b) a first and a second pressure detecting arrangement, wherein the first and second pressure detecting arrangements are acoustically connected to a front volume of the sound and vibration sensor, and wherein each front volume is acoustically connected to the exterior of the sound and vibration sensor via a sound inlet wherein the first pressure detecting arrangement is acoustically connected to the first rear volume, and wherein the second pressure detecting arrangement is acoustically connected to the second rear volume.

In the present context a sound and vibration sensor is to be understood as a transducer being capable of measuring 1) sound in the form of pressure variations, and 2) vibrations of the sound and vibration sensor. Thus, the sound and vibration sensor of the present invention aims at combining the functioning of an audio transducer and a vibration transducer instead of using two distinct and separate transducers.

In the sound and vibration sensor of the present invention the first and second pressure detecting arrangements are applied for detecting both incoming sound as well as vibrations of the sound and vibration sensor. While the first and second pressure detecting arrangements are directly sensitive to incoming sound, vibrations of the sound and vibration sensor need to be transformed to pressure variations before being detectable by the first and second pressure detecting arrangements. This transformation is provided by the pressure generating arrangement which is adapted to generate pressure variations in the first and second rear volumes in response to vibrations of the sound and vibration sensor.

The sound and vibration sensor of the present invention is advantageous due to its small overall size as this allows the sound and vibration sensor to be incorporated into personal audio devices, including hearing devices, hearing aids, hearables, earbuds or the like.

Moreover, the sound and vibration sensor is advantageous in that sound and vibrations can be measured at the same position, i.e. at the same spot.

The small overall size of the sound and vibration sensor of the present invention is provided by sharing selected elements of the audio transducer and the vibration transducer. As it will be demonstrated the elements shared between the audio transducer and the vibration transducer may involve a housing, a printed circuit board (PCB), electrical contacts, signal processors etc.

Preferably, the moveable mass and the suspension member of the pressure generating arrangement separate the first rear volume from the second rear volume. It should be noted though that vent holes are preferably provided between the front volume and the first and second rear volumes in order to prevent static pressures across the membranes. Thus, when the sound and vibration sensor is exposed to vibrations, the moveable mass and the suspension member are displaced and thus generate pressure variations in both the first rear volume and the second rear volume. As the first pressure detecting arrangement is acoustically connected to the first rear volume, pressure variations generated therein can be detected by the first pressure detecting arrangement. Similarly, as the second pressure detecting arrangement is acoustically connected to the second rear volume, pressure variations generated therein can be detected by the second pressure detecting arrangement. It is advantageous that the moveable mass does not form part of the first and second pressure detection arrangements because this allows for a higher weight of the moveable mass relative to an integrated mass. Moreover, the first and second rear volumes between the pressure generating arrangement and the first and second pressure detection arrangements may be made as small as possible as this provides a higher sensitivity of the sound and vibration sensor.

It is advantageous that the moveable mass and the suspension member, as a single vibrating element, generate pressure variations in both the first rear volume and the second rear volume in that the moveable mass and the suspension member are then shared between the first and second pressure detecting arrangements. This sharing ensures the same (and opposite) volumetric variations in the two rear volumes. The pressure variations are the same, if the two rear volumes are equal in size, with respect to magnitude and opposite with respect to phase, i.e. antiphase/counterphase.

In a preferred embodiment the first pressure detecting arrangement comprises a first MEMS cartridge comprising a front volume and a moveable membrane. Similarly, the second pressure detecting arrangement preferably comprises a second MEMS cartridge comprising a front volume and a moveable membrane. The moveable membranes of the first and second MEMS cartridges are electrically biased relative to their corresponding backplates, either by a permanent charge (=electret) or by a DC voltage where the latter is generated by a bias voltage generator in the signal processor.

Preferably the sound and vibration sensor further comprises one or more signal processors electrically connected to the first and second MEMS cartridges. The output signals from both the first and second MEMS cartridges contain mixed information about vibration and sound. The one or more signal processors are preferably adapted to process the output signals from the first and second MEMS cartridges in order to provide one signal representing vibration, and one signal representing sound.

In a preferred embodiment the front volume comprises a common front volume being acoustically connected to the first and second pressure detecting arrangements. In this preferred embodiment the common front volume is acoustically connected to the exterior of the sound and vibration sensor via a common sound inlet. Sharing a common sound inlet is advantageous in that it ensures that the acoustical signals received by the first and second pressure detecting arrangements are identical in phase and magnitude. In alternative embodiments distinct and separate front volumes may exist for each pressure detecting arrangements.

Preferably, the one or more signal processors and the first and second MEMS cartridges are arranged in the common front volume of the sound and vibration sensor. This is advantageous in that it reduces the overall size of the sound and vibration sensor. Moreover, it simplifies the implementation and the manufacturing of the sound and vibration sensor.

The one or more signal processors and the first and second MEMS cartridges are preferably arranged on a first surface of a first PCB. In the present context the term "first surface" should be understood as an inner surface, or an inner surface portion, of the first PCB that faces the common front volume of the sound and vibration sensor. Arranging the one or more signal processors and the first and second MEMS cartridges on the same first surface of the first PCB is advantageous in that electrical connections between the one or more signal processors and the first and second MEMS cartridges may easily be provided via wire bonding, printed connections on the first PCB or the like.

In order to reduce the overall size of the sound and vibration sensor to a minimum, the pressure generating arrangement is preferably arranged on a second surface of the first PCB.

Preferably, the second surface of the first PCB opposes the first surface of the first PCB. Thus, the moveable mass and the suspension member of the pressure generating arrangement are preferably arranged on a second surface of the first PCB that opposes the first surface of the first PCB. In addition to the moveable mass and the suspension member, the pressure generating arrangement preferably further comprises a housing arranged on the second surface of the first PCB.

As it will be discussed in further details below, the first rear volume may, in a preferred embodiment, be defined by a combination of at least the housing, a first portion of the surface of the first PCB and the suspension member. Similarly, the second rear volume may be defined by a combination of at least a second portion of the surface of the first PCB, the suspension member and the moveable mass.

Preferably, the first PCB comprises a first acoustical opening adapted to acoustically connect the first MEMS cartridge to the first rear volume. The first PCB preferably also comprises a second acoustical opening adapted to acoustically connect the second MEMS cartridge to the second rear volume. Thus, the first MEMS cartridge is acoustically connected to the first rear volume via the first acoustical opening in the first PCB, and the second MEMS cartridge is acoustically connected to the second rear volume via the second acoustical opening in the first PCB.

In the sound and vibration sensor of the present invention the common front volume is preferably, and at least partly, defined by the first PCB, a second PCB and a wall portion arranged between the first and second PCB's. The first and second PCB's are preferably arranged in parallel. The common sound inlet comprises an acoustical opening preferably arranged in the second PCB, i.e. the common sound inlet is preferably provided as an acoustical opening in the second PCB. Thus, the common front volume of the sound and vibration sensor is preferably acoustically connected to the exterior of the sound and vibration sensor via the acoustical opening/common sound inlet in the second PCB.

Preferably, one or more via's are provided between the first and second PCB's in order to provide one or more electrical connections between the first and second PCB's. Moreover, one or more electrical contact pads are preferably arranged on an outer surface of the second PCB. The one or more electrical contact pads are advantageous in that they provide easy electrical access to other electrical devices, such as external signal processors, power supplies etc., via flip-chip mounting. Preferably, the one or more electrical contact pads are implemented as one or more solder pads.

As previously mentioned, the sound and vibration sensor is adapted to be used in personal audio devices, including hearing devices, hearing aids, hearables, earbuds or the like. With this in mind the overall length of the sound and vibration sensor is preferably smaller than 4 mm, and the overall width of the sound and vibration sensor is preferably smaller than 3 mm, and the overall height of the sound and vibration sensor is preferably smaller than 1.5 mm.

In a second aspect the present invention relates to a personal audio device comprising a sound and vibration sensor according to the first aspect, said personal audio device being selected from the group consisting of hearing devices, hearing aids, hearables, earbuds or the like.

In general, the various aspects of the invention may be combined and coupled in any way possible within the scope of the invention. These and other aspects, features and/or advantages of the invention will be apparent from and elucidated with reference to the embodiments described hereinafter.

BRIEF DESCRIPTION OF THE DRAWINGS

The present invention will now be described in further details with reference to the accompanying figures where.

DETAILED DESCRIPTION OF THE INVENTION

In general, the present invention relates to a sound and vibration sensor for personal audio devices, including hearing devices, hearing aids, hearables, earbuds or the like. The sound and vibration sensor of the present invention is advantageous due to its small overall size and its capability of measuring both sound and vibrations at the same position, such as within the same sensor housing.

Figure 1:
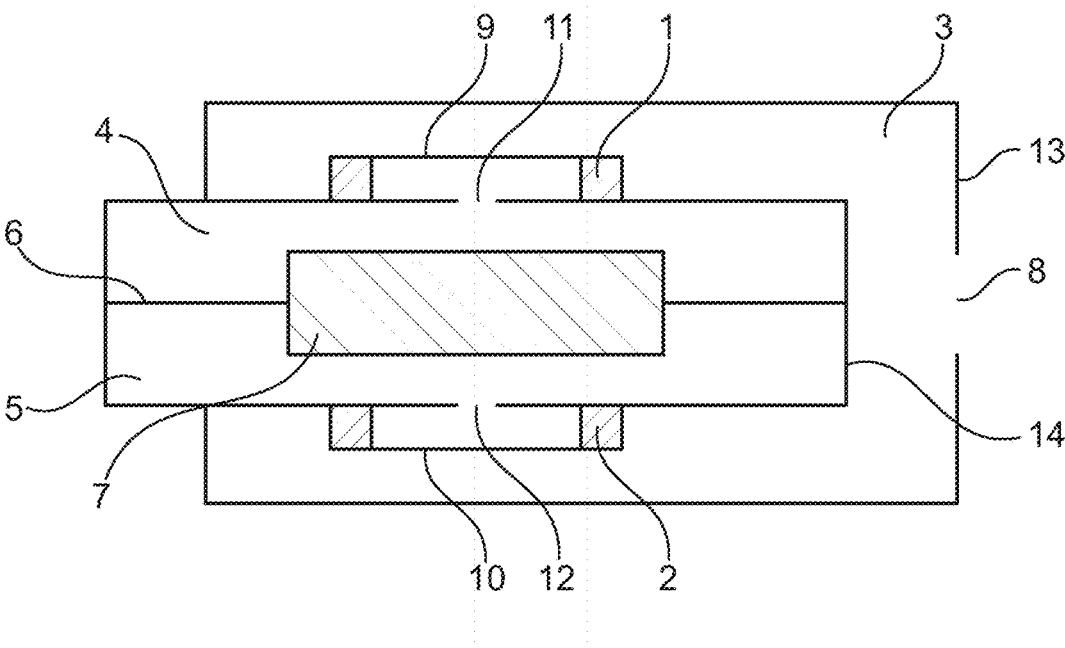
FIG. 1 shows a schematic cross-sectional view of a sound and vibration sensor according to the present invention.
Figure 2A:
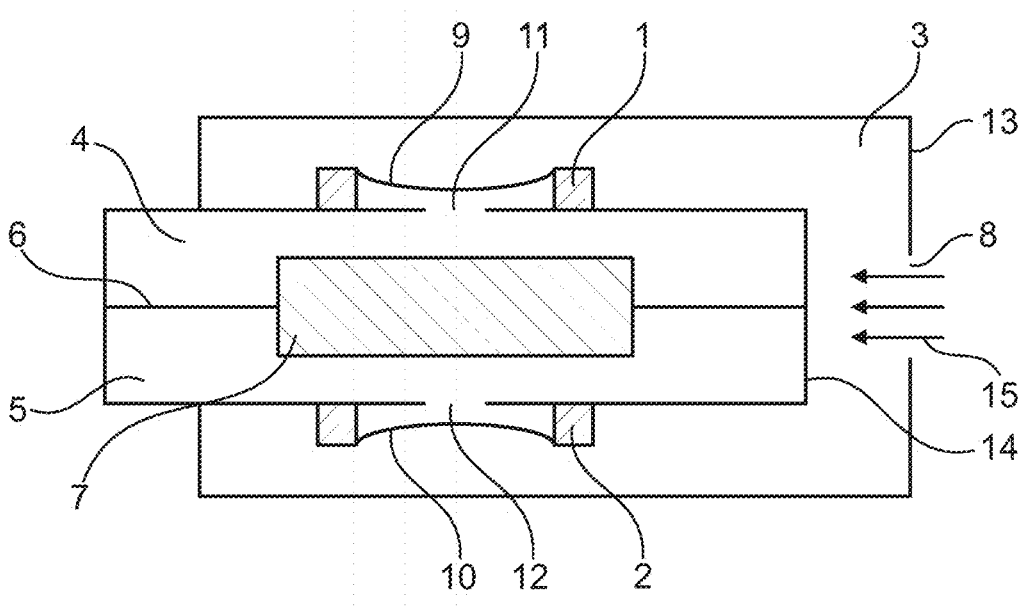
FIG. 2A shows a schematic cross-sectional view of a sound and vibration sensor when it is exposed to incoming sound.

Referring now to FIG. 1, a schematic cross-sectional view of the sound and vibration sensor according to the present invention is depicted. As seen FIG. 1 the sound and vibration sensor comprises first and second MEMS cartridges 1, 2 each comprising a moveable membrane 9, 10. The moveable membranes 9, 10 of the first and second MEMS cartridges 1, 2 are electrically biased relative to their corresponding backplates, either by a permanent charge (=electret) or by a DC voltage where the latter is generated by a bias voltage generator in the signal processor. Incoming sound enters a common front volume 3 of the sound and vibration sensor via a common sound inlet 8 in a first housing 13. As the first and second MEMS cartridges 1, 2 are arranged inside the common front volume 3, and thus acoustically connected to the common front volume 3, the first and second MEMS cartridges 1, 2 may detect incoming sound directly as depicted in FIG. 2A where the moveable membranes 9, 10 are deflected in the same inward direction (seen from the MEMS cartridges) in response to an increased sound pressure 15 due to incoming sound. It should be noted that the common front volume 3 may optionally be omitted whereby the first and second MEMS cartridges 1, 2 become directly acoustically connected to the exterior of the sound and vibration sensor.

Figure 2B:
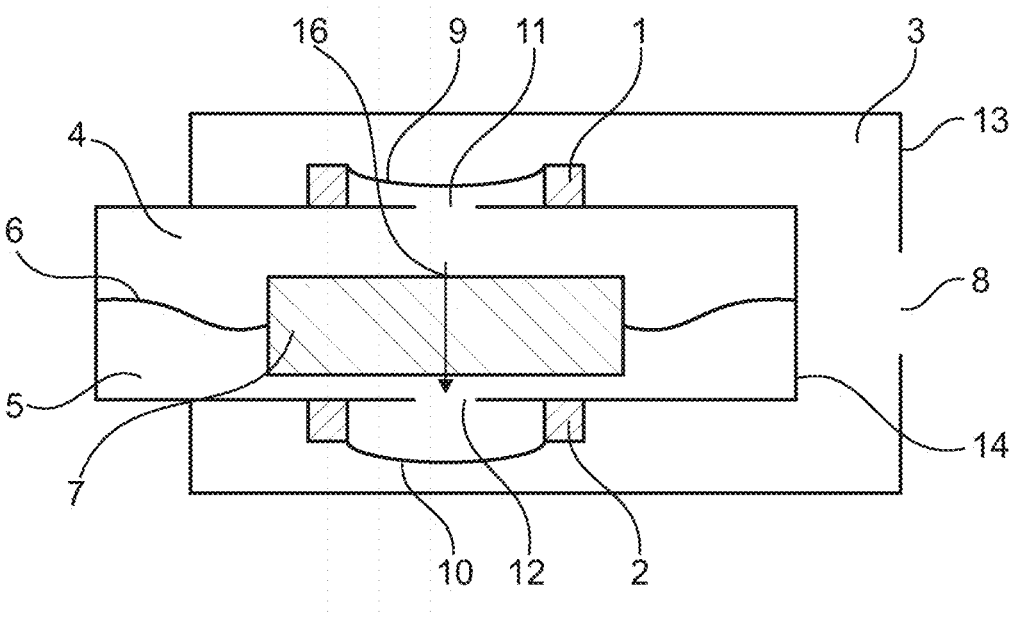
FIG. 2B shows a schematic cross-sectional view of a sound and vibration sensor when it is exposed to vibrations.

Returning to FIG. 1, the first and second MEMS cartridges 1, 2 are acoustically connected to the respective first and second rear volumes 4, 5 via respective acoustical openings 11, 12 in a second housing 14. As depicted in FIG. 1, the first and second rear volumes 4, 5 are separated by a moveable mass 7 secured to a resilient suspension member 6. It should be noted though that vent holes (not shown) are preferably provided between the front volume 3 and the first and second rear volumes 4, 5 in order to prevent static pressures across the membranes. The resilient suspension member 6 may be implemented as a sheet of foil or film or another suitable material. The resilient properties of the suspension member 6 provide that the moveable mass 7 is allowed to vibrate or displace up and down in response to vibrations of the sound and vibration sensor as depicted in FIG. 2B where the moveable mass 7 is displaced to an off-centre position as indicated by the arrow 16, and the moveable membranes 9, 10 of the first and second MEMS cartridges 1, 2 are deflected in opposite directions (seen from the MEMS cartridges) in response to vibrations of the sound and vibration sensor. It should in this respect be noted that a displacement of the moveable mass 7 will ideally induce a pressure change in the first rear volume 4, and an inverse pressure change in the second rear volume 5.

Although not shown in FIGS. 1 and 2, one or more signal processors are provided for processing signals from the first and second MEMS cartridges 1, 2. As it will be discussed in further details in relation to FIGS. 5 and 6, a signal proportional to the incoming sound pressure can be derived by adding the output signals from the first and second MEMS cartridges 1, 2, whereas a signal proportional to the acceleration can be derived by subtracting the output signals from the first and second MEMS cartridges 1, 2. The signal processing can be analog and/or digital.

The method of adding and subtracting output signals from the first and second MEMS cartridges only applies if all relevant volumes and MEMS cartridges are identical, i.e. matched. In order to compensate for deviations/mismatch, the signal processing of the output signals from the first and second MEMS cartridges may involve the use of correction factors that may be stored in a memory unit. These correction factors, that may be frequency dependent, may be determined and stored during manufacturing of the sound and vibration sensor.

The first and second rear volumes 4, 5 can be tuned in order to reach an optimum on the trade-off on the ratio between acoustical and vibrational sensitivity, i.e. smaller volumes imply more vibrational sensitivity and less acoustical sensitivity. The best performance is found when the compliances of the first and second rear volumes 4, 5 match the respective compliances of the first and second MEMS cartridges 1, 2.

Figure 3:
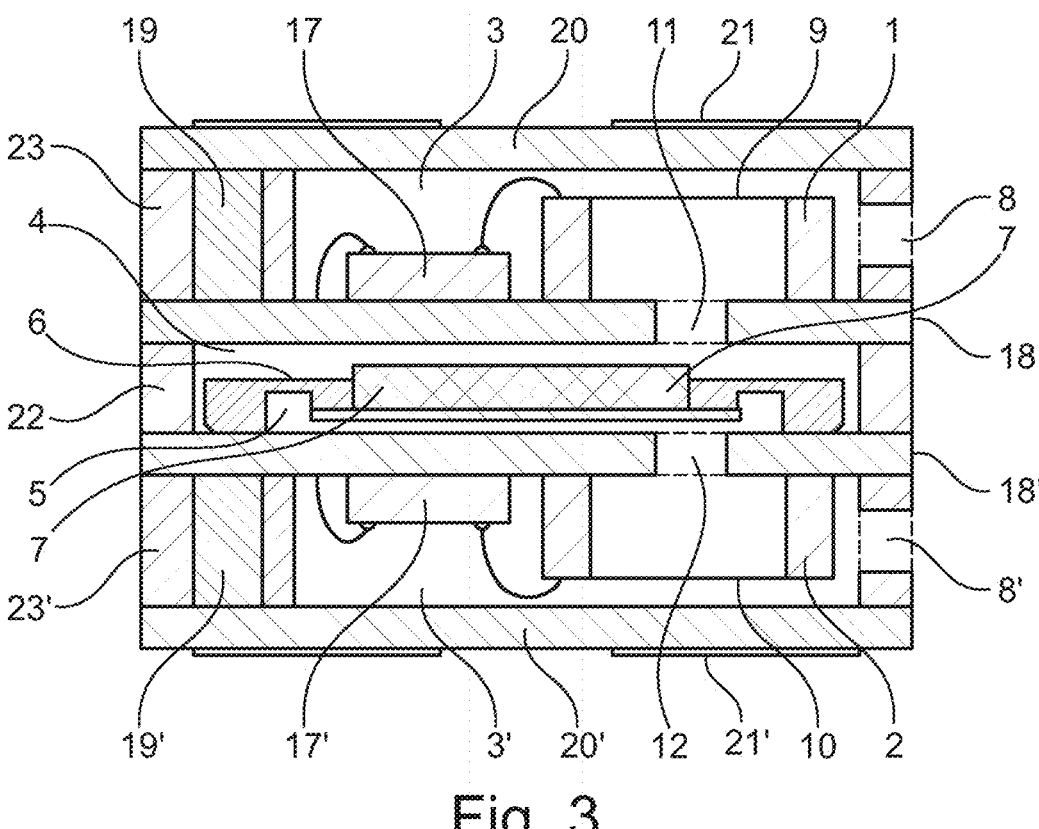
FIG. 3 shows a cross-sectional view of an embodiment of the present invention.

FIG. 3 shows an embodiment of a sound and vibration sensor according to the present invention. As seen in FIG. 3 the sound and vibration sensor comprises a pressure generating arrangement sandwiched between two MEMS microphones. Each MEMS microphone comprises a MEMS cartridge 1, 2 and a signal processor 17, 17' electrically connected to the respective MEMS cartridges. The MEMS cartridges 1, 2 and signal processors 17, 17' are arranged on respective first PCB's 18, 18' each having an acoustical opening 11, 12 aligned with the respective MEMS cartridges 1, 2. As depicted in FIG. 3, the first MEMS cartridge 1 is acoustically connected to the rear volume 4 via the acoustical opening 11, and the second MEMS cartridge 2 is acoustically connected to the rear volume 5 via the acoustical opening 12. Each MEMS microphone further comprises a second PCB 20, 20' with electrical contact pads 21, 21' arranged thereon. Moreover, wall portions 23, 23' are arranged between the respective first PCB's 18, 18' and second PCB's 20, 20', and one or more via's 19, 19' electrically connect the respective first PCB's 18, 18' and second PCB's 20, 20'. Incoming sound enters the front volumes 3, 3' of the sound and vibration sensor via sound inlets 8, 8' in the respective wall portions 23, 23'.

A spout (not shown) is preferably connected to the sound inlets 8, 8' in order to form a common sound inlet. A common sound inlet is, as already mentioned, advantageous in that it ensures that the acoustical signals received by the first and second MEMS cartridges 1, 2 are identical in phase and magnitude. The pressure generating arrangement comprises a moveable mass 7 and a suspension member 6 which, in combination, separate the two rear volumes 4, 5. In response to vibrations of the sound and vibration sensor the moveable mass 7 and the suspension member 6 will also vibrate and thus generate pressure variations in the rear volumes 4, 5. As already addressed, these pressure variations, which ideally are inverse, may be detected by the respective MEMS cartridges 1, 2.

As seen in FIG. 3, the suspension member 6 is a moulded structure secured to the first PCB 18' of the lower MEMS microphone. It should however be noted that the suspension member 6 could equally be secured to the first PCB 18 of the upper MEMS microphone. As seen in FIG. 3 the two MEMS microphones are separated by a spacer 22 which also forms a boundary with respect to the rear volume 4. The two signal processors 17, 17' are in FIG. 3 depicted as distinct and separate signal processors. The pre-processed signals from the signal processors 17, 17' may be further processed by an external signal processor (not shown) so that a signal proportional to the incoming sound pressure can be derived by adding the output signals from the two signal processors 17, 17', and a signal proportional to the acceleration can be derived by subtracting the output signals from the two signal processors 17, 17'. Again, the signal processing can be analog and/or digital.

Figure 4:
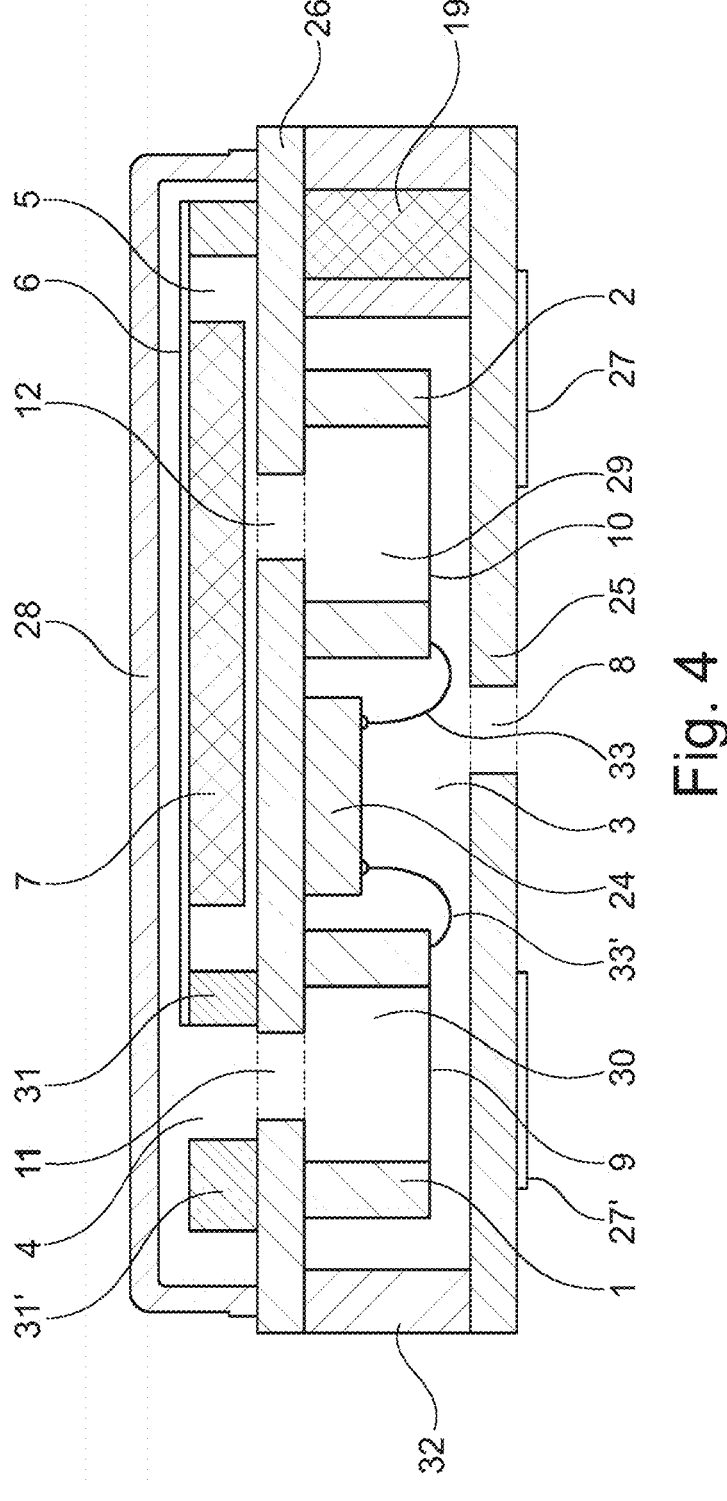
FIG. 4 shows a cross-sectional view of a preferred embodiment of the present invention.

Turning now to FIG. 4, a preferred embodiment of the present invention is depicted. In contrast to the embodiment shown in FIG. 3, the preferred embodiment shown in FIG. 4 comprises a common front volume 3 instead of distinct and separate front volumes. The preferred embodiment shown in FIG. 4 is advantageous due to its compactness, in particular with respect to its limited height.

As seen in FIG. 4, the common front volume 3 is defined by a wall portion 32 sandwiched between a first PCB 26 and a second PCB 25 with electrical contact pads 27, 27' arranged thereon. One or more via's 19 electrically connect the first and second PCB's 25, 26. Moreover, the second PCB 25 comprises a sound inlet 8 that acoustically connects the common front volume 3 with the exterior of the sound and vibration sensor. As seen in FIG. 4 two MEMS cartridges 1, 2 with respective front volumes 30, 29 and moveable membranes 9, 10 and a common signal processor 24 are arranged in the common front volume 3. The two MEMS cartridges 1, 2 are electrically connected to the common signal processor 24 via wire bonding 33, 33'. Alternatively, the two MEMS cartridges 1, 2 may be electrically connected to the common signal processor 24 via the first PCB 26 to which the MEMS cartridges 1, 2 and the common signal processor 24 are secured.

In the preferred embodiment shown in FIG. 4 the first MEMS cartridge 1 is acoustically connected to the rear volume 4 via an acoustical opening 11 in the first PCB 26. Similarly, the second MEMS cartridge 2 is acoustically connected to the rear volume 5 via an acoustical opening 12 in the first PCB 26. As seen in FIG. 4 a combination of the spacer 31, the suspension member 6 and the moveable mass 7 separate the two rear volumes 4, 5. In response to vibrations of the sound and vibration sensor the moveable mass 7 and the suspension member 6 generate pressure variations in the rear volumes 4, 5, and these pressure variations may be detected by the respective MEMS cartridges 1, 2 as previously addressed. A housing 28 secured to the first PCB 26 encapsulates the moveable mass 7 and the moveable membrane 6, and sets an outer boundary of the rear volume 4. The spacer 31 forms part of a spacer structure that also includes spacer 31'. The role of the spacer 31' is to reduce the volume of rear volume 4 thus matching it to the rear volume 5.

The common signal processor 24 is adapted to generate a signal proportional to the incoming sound pressure by adding the output signals from the two MEMS cartridges 1, 2, and adapted to generate a signal proportional to the acceleration by subtracting the output signals from the two MEMS cartridges 1, 2. Again, the signal processing can be performed in the analog and/or the digital domain.

Figure 5:
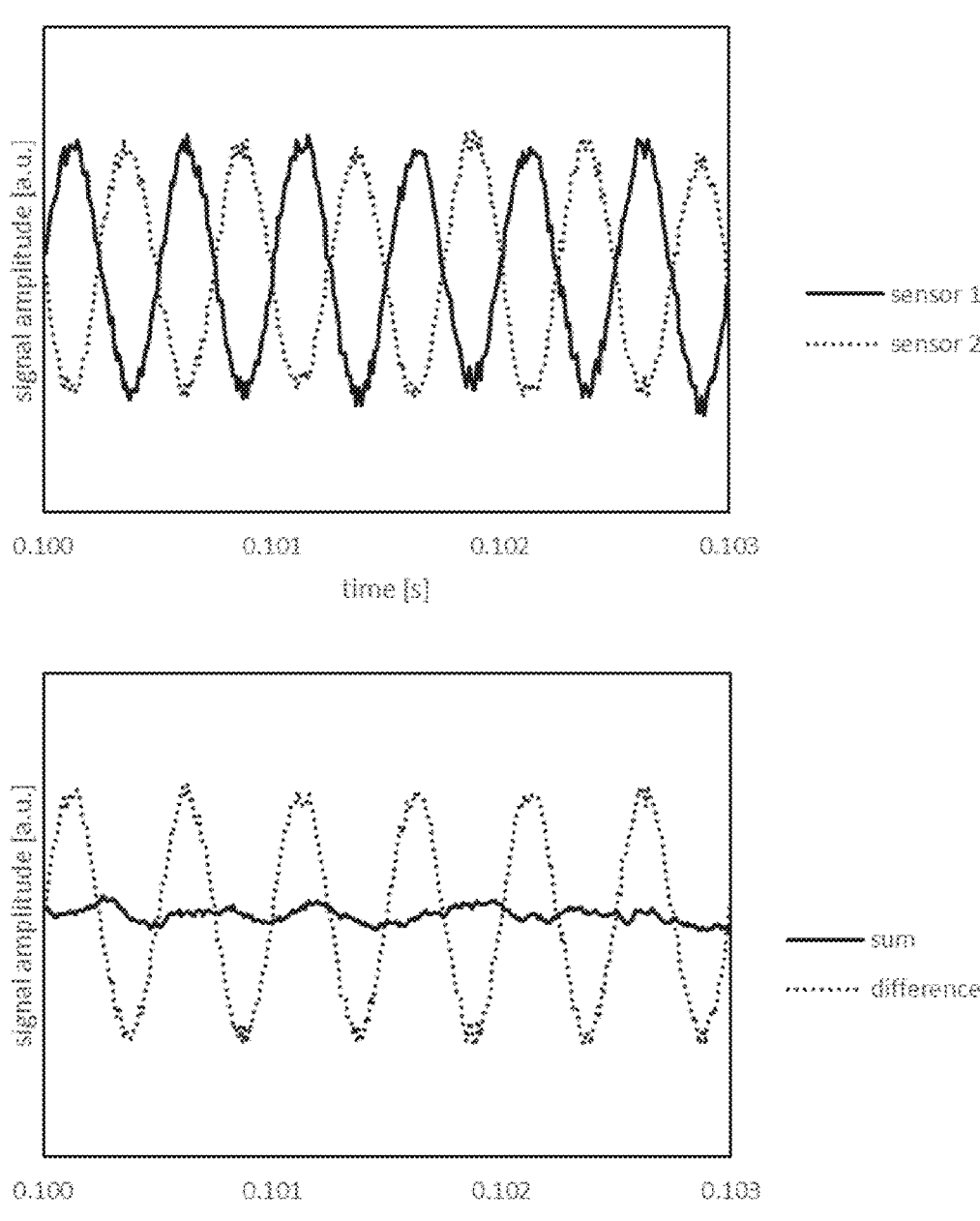
FIG. 5 shows pre- and post-processed signals from the sound and vibration sensor unit when vibrations are predominant.
Figure 6:
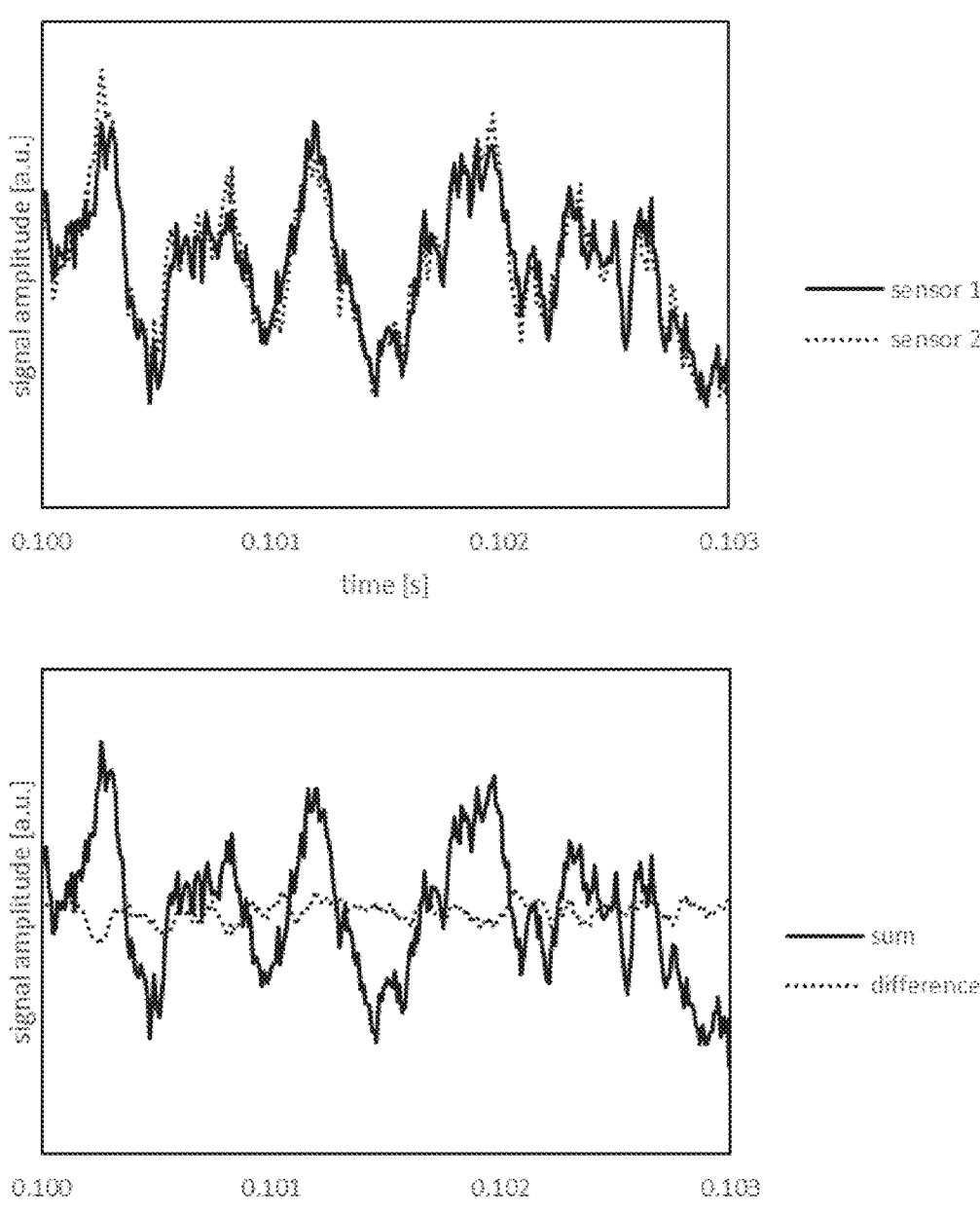
FIG. 6 shows pre- and post-processed signals from the sound and vibration sensor when incoming sound is predominant.

In FIGS. 5 and 6 the responses from a sound and vibration sensor in two different scenarios are depicted. In FIG. 5 the sound and vibration sensor is primarily exposed to sinewave-shaped mechanical vibrations, whereas in FIG. 6 the sound and vibration sensor is primarily exposed to incoming sound.

In the upper graph of FIG. 5 the two inverse output signals from the two MEMS cartridges (sensor 1 and sensor 2) are shown. The inverse nature of the output signals is due to the opposite deflection of the moveable membranes of the MEMS cartridges, cf. FIG. 2B. In the lower graph of FIG. 5 the inverse output signals from the two MEMS cartridges have been added (sum) and subtracted (difference). It is seen that subtracting the inverse output signals from the two MEMS cartridges yields the original sinewave of the mechanical vibration. The acoustical noise present on each output signal is clearly suppressed when inverse output signals are subtracted. Adding the inverse output signals from the two MEMS cartridges, on the other hand, clearly cancels the vibration-related sinewave, and the remaining signal represents acoustical noise.

Similarly, in the upper graph of FIG. 6 the two output signals from the two MEMS cartridges (sensor 1 and sensor 2) are shown in response to an incoming sound. The in-phase nature of the output signals is a consequence of the identical deflection of the moveable membranes of the MEMS cartridges, cf. FIG. 2A. In the lower graph of FIG. 5 the output signals from the two MEMS cartridges have again been added (sum) and subtracted (difference). It is seen that adding the output signals from the two MEMS cartridges yields the original incoming sound.

Subtracting the output signals from the two MEMS cartridges, on the other hand, clearly cancels the sound, and the remaining signal represents vibrational noise.

The overall height of the preferred embodiment shown in FIG. 4 is preferably less than 2 mm, such as less than 1.5 mm, such as less than 1 mm.

Moreover, the mass of the moveable mass 7 is preferable around 4 mg. It is estimated that the practical minimum mass would be around 0.004 mg as this would increase the noise level with 30 dB. Similarly, a mass of 0.04 mg would increase the noise level with 20 dB, and a mass of 0.4 mg would increase the noise level with 10 dB. Thus, the higher the mass of the moveable mass 7 the lower is the effect of the thermal movement noise of the micro-electromechanical transducer.

Referring to FIGS. 1-4 the first and second rear volumes 4, 5 should be as small as possible. Preferably, the first and second rear volumes 4, 5 are smaller than 1 mm$^3$, such as smaller than 0.75 mm$^3$, such as smaller than 0.5 mm$^3$, such as smaller than 0.25 mm$^3$, such as smaller than 0.1 mm$^3$, such as smaller than 0.05 mm$^3$.

Also, and still referring to FIGS. 1-4, the total area of the suspension member 6 should be as large as possible, and preferably larger than 0.5 mm$^2$, such as larger than 1 mm$^2$, such as larger than 2 mm$^2$, such as larger than 4 mm$^2$, such as larger than 6 mm$^2$, such as larger than 8 mm$^2$, such as larger than 10 mm$^2$. A large total area is advantageous as this requires a smaller amplitude of the movement of the moveable mass 7 in order to reach certain volume displacement and thereby sensitivity.

Although the invention has been discussed in the foregoing with reference to exemplary embodiments of the invention, the invention is not restricted to these particular embodiments which can be varied in many ways without departing from the invention. The discussed exemplary embodiments shall therefore not be used to construe the appended claims strictly in accordance therewith. On the contrary, the embodiments are merely intended to explain the wording of the appended claims, without intent to limit the claims to these exemplary embodiments. The scope of protection of the invention shall therefore be construed in accordance with the appended claims only, wherein a possible ambiguity in the wording of the claims shall be resolved using these exemplary embodiments.

The invention claimed is:

1. A sound and vibration sensor, the sound and vibration sensor comprising:

a pressure generating arrangement adapted to generate pressure variations in both a first rear volume and a second rear volume in response to vibrations of the sound and vibration sensor, the pressure generating arrangement comprising a moveable mass secured to a suspension member; and a first pressure detecting arrangement and a second pressure detecting arrangement, wherein the first pressure detecting arrangement and the second pressure detecting arrangement are acoustically connected to an exterior of the sound and vibration sensor via at least one front volume, the at least one front volume each acoustically connected to the exterior of the sound and vibration sensor via a respective sound inlet, wherein the first pressure detecting arrangement is acoustically connected to the first rear volume, and the second pressure detecting arrangement is acoustically connected to the second rear volume, and wherein the moveable mass and the suspension member collectively divide a volume into the first rear volume and the second rear volume.

2. The sound and vibration sensor according to claim 1, wherein:

the first pressure detecting arrangement comprises a first MEMS cartridge, the first MEMS cartridge comprising a first front volume and a first moveable membrane, and the second pressure detecting arrangement comprises a second MEMS cartridge, the second MEMS cartridge comprising a second front volume and a second moveable membrane.

3. The sound and vibration sensor according to claim 2, wherein the sound and vibration sensor further comprises one or more signal processors, and wherein the first MEMS cartridge and the second MEMS cartridge are electrically connected to the one or more signal processors.

4. The sound and vibration sensor according to claim 1, wherein:

the at least one front volume is a common front volume, the common front volume acoustically connected to both the first pressure detecting arrangement and the second pressure detecting arrangement, and the common front volume is acoustically connected to the exterior of the sound and vibration sensor via a common sound inlet.

5. The sound and vibration sensor according to claim 4, wherein:

the first pressure detecting arrangement comprises a first MEMS cartridge, the first MEMS cartridge comprising a first front volume and a first moveable membrane, the second pressure detecting arrangement comprises a second MEMS cartridge, the second MEMS cartridge comprising a second front volume and a second moveable membrane, the sound and vibration sensor further comprises one or more signal processors, the first MEMS cartridge and the second MEMS cartridge electrically connected to the one or more signal processors, and the one or more signal processors, the first MEMS cartridge, and the second MEMS cartridge are in the common front volume.

6. The sound and vibration sensor according to claim 5, wherein the one or more signal processors, the first MEMS cartridge, and the second MEMS cartridge are on a first surface of a first PCB.

7. The sound and vibration sensor according to claim 6, wherein the pressure generating arrangement is on a second surface of the first PCB.

8. The sound and vibration sensor according to claim 7, wherein the pressure generating arrangement further comprises a housing on the second surface of the first PCB.

9. The sound and vibration sensor according to claim 6, wherein the first PCB comprises:

a first acoustical opening adapted to acoustically connect the first MEMS cartridge to the first rear volume, and a second acoustical opening adapted to acoustically connect the second MEMS cartridge to the second rear volume.

10. The sound and vibration sensor according to claim 6, wherein the common front volume is at least partly defined by the first PCB, a second PCB and a wall portion, the wall portion between the first PCB and the second PCB.

11. The sound and vibration sensor according to claim 10, wherein the common sound inlet comprises an acoustical opening in the second PCB.

12. The sound and vibration sensor according to claim 10, further comprising:

one or more vias are between the first PCB and the second PCB, and one or more electrical contact pads on an outer surface of the second PCB.

13. The sound and vibration sensor according to claim 1, wherein:

an overall length of the sound and vibration sensor is smaller than 4 mm, an overall width of the sound and vibration sensor is smaller than 3 mm, and an overall height of the sound and vibration sensor is smaller than 1.5 mm.

14. A personal audio device comprising the sound and vibration sensor according to claim 1, said personal audio device being a hearing device, a hearing aid, a hearable, or an earbud.

15. A personal audio device comprising the sound and vibration sensor according to claim 1, said personal audio device being a hearing device, a hearing aid, a hearable, or an earbud.

16. A sound and vibration sensor, the sound and vibration sensor comprising:

a pressure generating arrangement adapted to generate pressure variations in both a first rear volume and a second rear volume in response to vibrations of the sound and vibration sensor, the pressure generating arrangement comprising a moveable mass secured to a suspension member; and a first pressure detecting arrangement and a second pressure detecting arrangement, wherein the first pressure detecting arrangement and the second pressure detecting arrangement are acoustically connected to an exterior of the sound and vibration sensor via at least one front volume, the at least one front volume each acoustically connected to the exterior of the sound and vibration sensor via a respective sound inlet, wherein the first pressure detecting arrangement is acoustically connected to the first rear volume, and the second pressure detecting arrangement is acoustically connected to the second rear volume, and wherein the moveable mass and the suspension member are configured to simultaneously:

increase pressure in one of the first rear volume or the second rear volume, and reduce pressure in another the first rear volume or the second rear volume.

17. The sound and vibration sensor according to claim 16, wherein:

the first pressure detecting arrangement comprises a first MEMS cartridge, the first MEMS cartridge comprising a first front volume and a first moveable membrane, and the second pressure detecting arrangement comprises a second MEMS cartridge, the second MEMS cartridge comprising a second front volume and a second moveable membrane.

18. The sound and vibration sensor according to claim 17, wherein the sound and vibration sensor further comprises one or more signal processors, and wherein the first MEMS cartridge and the second MEMS cartridge are electrically connected to the one or more signal processors.

19. The sound and vibration sensor according to claim 16, wherein:

the at least one front volume is a common front volume, the common front volume acoustically connected to both the first pressure detecting arrangement and the second pressure detecting arrangement, and the common front volume is acoustically connected to the exterior of the sound and vibration sensor via a common sound inlet.

20. The sound and vibration sensor according to claim 19, wherein:

the first pressure detecting arrangement comprises a first MEMS cartridge, the first MEMS cartridge comprising a first front volume and a first moveable membrane, the second pressure detecting arrangement comprises a second MEMS cartridge, the second MEMS cartridge comprising a second front volume and a second moveable membrane, the sound and vibration sensor further comprises one or more signal processors, the first MEMS cartridge and the second MEMS cartridge electrically connected to the one or more signal processors, and the one or more signal processors, the first MEMS cartridge, and the second MEMS cartridge are in the common front volume.

* * * * *